Jan. 31, 1967 E. E. MAYO ETAL 3,301,507
HYPERSONIC REENTRY VEHICLE
Filed Dec. 31, 1964 2 Sheets-Sheet 1
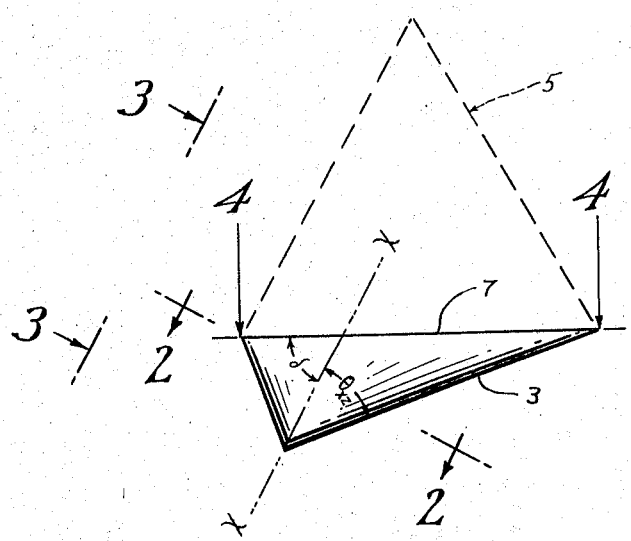
Fig. 1
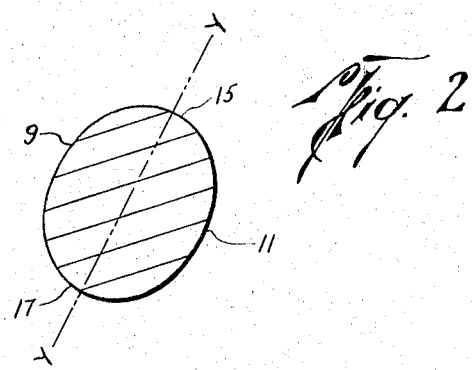
Fig. 2
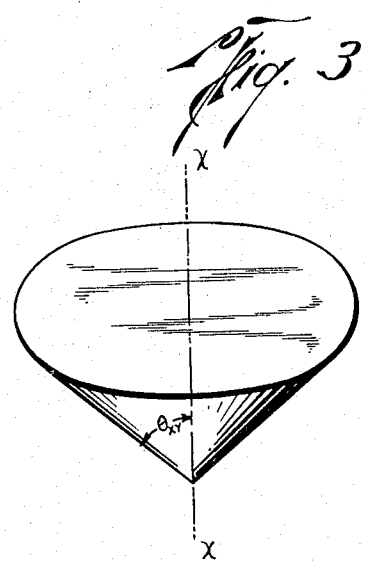
Fig. 3
Fig. 4
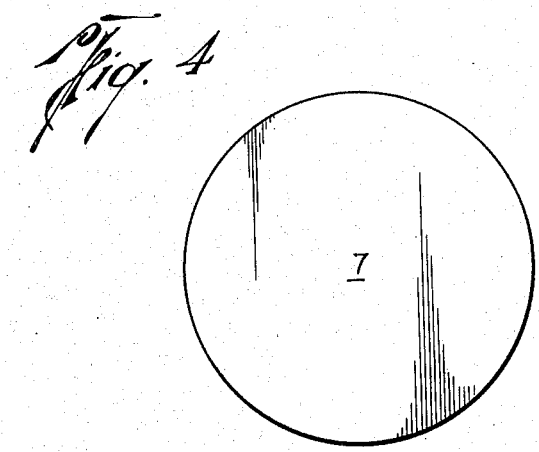
Edward E. Mayo
Robert H. Lamb
INVENTORS
BY
ATTORNEYS

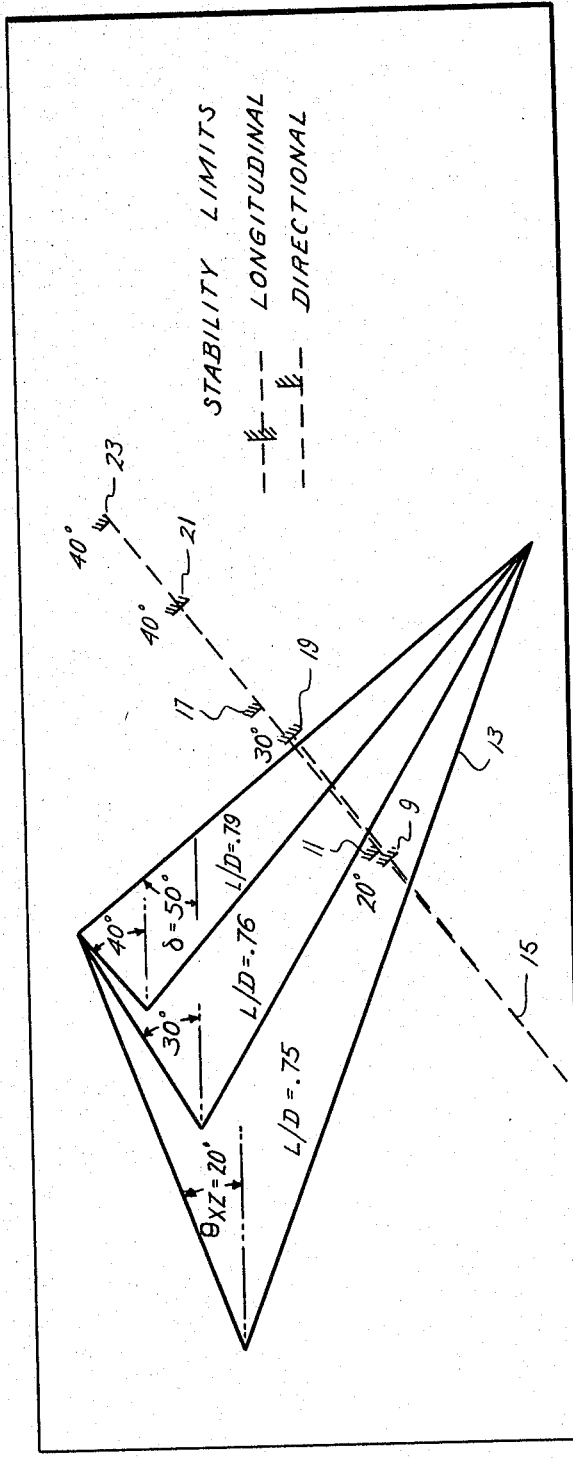

United States Patent Office 3,301,507
Patented Jan. 31, 1967

1

3,301,507
HYPERSONIC REENTRY VEHICLE
Edward E. Mayo, Beltsville, Md., and Robert H. Lamb, Houston, Tex., assignors to the United States of America as represented by the Administrator of the National Aeronautics and Space Administration
Filed Dec. 31, 1964, Ser. No. 422,865
9 Claims. (Cl. 244—1)

The invention described herein may be manufactured and used by or for the government of the United States of America for governmental purposes without the payment of any royalties thereon or therefor.

This invention relates to earth reentry vehicles and more particularly to the configuration of the heat shield portion thereof.

It is contemplated that astronauts may, within the foreseeable future, engage in extensive exploratory trips into outer space in order to examine various planets in the solar system. After completiong these explorations, they will return to the vicinity of the earth and then proceed to reenter the atmosphere thereabout. The velocity of the reentry vehicle during this portion of the trip will depend to a substantial degree upon the distance from the earth of the planet which was explored and the type of trajectory which is flown on the return trip. The entry velocity being a relatively immutable factor, therefore governs to a great extent the design of the vehicle, not only in its aerodynamic form, but also with respect to other factors resulting from the velocity, such as heating and guidance. Thus the design of the reentry vehicle for an earth orbital mission in which the entry velocities are on the order of 25 thousand feet per second will differ from that of a vehicle returning from a lunar mission wherein the entry velocities are approximately 36 thousand feet per second. Likewise, the design of the reentry vehicle returning from Mars at a velocity of between 45 thousand to 65 thousand feet per second will differ significantly from both that of the lunar vehicle and the orbital vehicle.

In order for the vehicle to safely enter the earth's atmosphere, it must be guided into a reentry corridor, the size of which is influenced by the reentry velocity and the lift to drag ratio of the vehicle. The corridor, as used herein, refers to a fictitous altitude difference between the overshoot and the undershoot perigee points, assuming no atmosphere. The overshoot altitude is that boundary above which the vehicle would skip out of the earth's atmosphere that is, the centrifugal forces would counteract and exceed the opposing forces resulting from gravity and reverse lift caused by rolling it over, whereas the undershoot is specified as that boundary below which the g-load exceeds 10, or the aerodynamic heating becomes excessive.

The primary factor influencing the fidelity of the vehicle's trajectory through the intended corridor is its inherent shape, or more specifically its lift to drag raito. Lift, which provides a means by which a vehicle can fly a curved path, allows a vehicle entering with the same maximum load constraint as a vehicle with no lift to enter at a steeper angle by curving the path away from the earth. By the same means of using lift to curve the path toward the earth, capture can be achieved at a shallower angle. One of the constraints which must necessarily be considered in varying the shape for lift to drag purposes, however, is the aerodynamic heating which occurs during reentry. As the vehicle enters and traverses the increasingly denser atmosphere, the frictional forces caused thereby reduce its kinetic energy and disperses it in the form of heat.

Although a given vehicular shape might optimize entry and trajectory fidelity through the corridor, it is recognizable that the particular shape may have an excessive heating effect upon the vehicle structure. In the same sense, a shape compromise which is considered within acceptable limits for heating and which has an acceptable lift to drag ratio, might be unacceptable for longitudinal or directional stability since this flight characteristic is likewise influenced by vehicular shape. Similarly, it might be recognized that a vehicle which is inherently stable and is within the required limits of numerous other characteristics may exceed the constraints imposed by certain control functions. As a result, modification of flight characteristics which are considered optimal in certain respects may become necessary in order to bring the overall vehicle configuration within the constraints laid down by other characteristics. In addition to the physical constraints noted above, numerous features are desirable, if not necessary, to incorporate in the design of a reentry vehicle. Thus a vehicle whose shape or aerodynamic attitude is amenable to flow field analysis, facilitates examination and study of its heating characteristics. A shape which might readily be adapted for connection to present booster configurations does not require the redesign of the booster interfaces and is therefore also highly desirable. Additionally it is necessary, of course, that the reentry vehicle not detract from the aerodynamic characteristics of its booster vehicle during the launch time or in the period before separation. All of the above considerations and limitations, along with numerous others, must be carefully studied and weighed before arriving at the final design of a reentry vehicle.

Prior art approaches to reentry vehicle design have to a large extent been limited to vehicles in the orbital and lunar velocity range, and have incorporated blunt body configurations generally similar to a right circular cone having a spherical segment as the heat shield or base portion. It has been found, however, during analysis of these configurations, that they are not acceptable for use in the hypersonic velocity ranges to be expected upon reentry from Mars, for example. The primary basis for this finding lies in the fact that blunt bodies encounter critical heating problems in this velocity regime. One of the solutions proposed by the prior art for hypersonic reentries embodied a modified circular cone which provided the required lift to drag ratio, and which also had acceptable heating characteristics. It was found, however, that this type of configuration was excessively deficient with respect to its directional stability. Various proposals have been suggested, but it was found that until the present invention certain stability deficiencies in the hypersonic range could not be remedied without exceeding the constraints imposed by other flight characteristics.

The present invention is therefore directed to a generic configuration for a reentry vehicle in the hypersonic velocity range. The configuration is generic in the sense that the specific shape of the forebody structure may be varied to allow reentry at specific velocities within this speed regime and yet satisfactorily retain both longitudinal and directional stability characteristics. Additionally, the configuration is readily amenable to field flow analysis and is readily adapted for connection to present booster vehicles. Still further, it is found that the configuration enables the use of present technology with respect to spacecraft packaging techniques since it may be connected to an afterbody portion which is circular in cross section. Numerous other features and attendant advantages of the present invention will become apparent upon examination of the following specification, claims, and drawings wherein like numerals denote like parts in the various views and wherein:

FIG. 1 is a side view showing in solid lines the forebody portion of the vehicle of the invention.

FIG. 2 is a sectional view along the plane 2—2 of FIG.

1, which plane is perpendicular to the axis of the forebody portion shown.

FIG. 3 is a top view of the raked elliptical forebody portion of the vehicle in the direction of the plane 3—3 of FIG. 1.

FIG. 4 is an axial view perpendicular to the raked surface of the forebody portion of FIG. 1 showing the circular cross section thereof.

FIG. 5 is a table illustrating the angular flexibility of the vehicle shape by using different half cone angles and rake angles, while still retaining a circular interface.

FIG. 6 is a diagrammatic illustration of three exemplary forebody configurations showing typical flexibility in placing the center of gravity to trim at zero angle of attack without exceeding the stability limits noted.

Since the vehicle of the present invention embodies no external appendages for controlling its entry path, it must traverse the intended corridor with fidelity by means of its inherent shape alone. More specifically it may be said that the lift to drag ratio which the vehicle shape provides governs the path or trajectory it will follow. Thus the lift to drag ratio is determined in accordance with the prescribed entry corridor requirements. Extensive studies have indicated that the lift to drag ratio of a vehicle having a conical forebody may be varied by slicing off or raking it at an acute angle. With reference to FIG. 1 there is shown a spacecraft vehicle having a forebody 3 and an afterbody portion 5 which meets the forebody along a common interface plane designated at 7. The forebody portion, more commonly referred to as the heat shield, is conical in shape but is acutely raked across its axis X—X at an angle $\delta$ which is measured in the vertical plane X–Z. Thus if the entry cooridor requirements have been set, the cone is raked at the appropriate angle to provide the vehicle with the appropriate lift to drag ratio.

The angle $\theta_{xz}$ of FIG. 1, lying in the same vertical plane as angle $\delta$, is referred to as the cone half angle and is known to be particularly influential of the radiative heating characteristics which the vehicle has at hypersonic velocities. Although this angle may have some effect on the lift to drag ratio, it is considered minimal to the extent that the former may be chosen with relative freedom and independence of the latter. This is particularly important with respect to manned vehicles since optimization of the lift to drag ratio assures high fidelity trajectory and hence mission reliability, while allowing freedom to choose the $\theta_{xz}$ which minimizes the radiative heating or, more appropriately, reduces total heating.

As shown in FIG. 2, the cross section of the improved forebody in a plane perpendicular to the axis thereof is that of an ellipse. For purposes of relative orientation of vehicle attitude it is noted that the upper and lower surfaces 9 and 11, respectively of the forebody are defined by the major arcs of the ellipse, while the side surfaces 15, 17 are defined by the minor arcs. The actual configuration of the elliptical cross section will otherwise be a function of both the angles $\theta_{zx}$ and $\theta_{xy}$. The angle $\theta_{xy}$ shown in FIG. 3 defines the cone half angle in the horizontal plane, that is the plane having the cone axis X–Y therein. This angle, it is found, influences the longitudinal and directional stability of the vehicle, particularly the latter. Although the specific degrees of stability which correspond to variations in this angle are also influenced by other factors such as center of gravity location, it is known that significant freedom exists to vary it without exceeding stability limits. Examples of the relative degree of this freedom are clearly set forth in the table of FIG. 5 which is discussed hereinafter.

In addition to those design factors of the vehicle which must be determined within specified and necessary constraints, it is considered highly desirable, if not also necessary, to incorporate in the design an interface plane 7 of circular shape. Although the advantages of the circular interface are numerous, those of conformity with booster vehicle cross sections, effectual and maximal use of past spacecraft interior packaging and design arrangements, and ability to mate the forebody (heat shield) with afterbodies having proven flying and heating characteristics are of primary importance. In FIG. 4 it is therefore seen that although the present heat shield is of elliptical cross section (as shown in FIG. 2), the interface plane 7 is in the shape of a circle and is so formed when the elliptical cone is raked across its axis. Since the rake angle is determined by the required lift to drag ratio and the circular interface is dictated by a specific rake angle, it may be recognized that a given elliptical cone may not necessarily embody both of these design features. It is found, however, that the angle $\delta$ and the circular interface may both be maintained over a wide range of elliptical cone angles without exceeding constraints laid down by the hypersonic velocity regime. The relationship of the angles of the elliptical cone discussed hereinbefore may be expressed by the equation:

$$\theta_{xy} = \tan^{-1}\left[\frac{\sqrt{1-\left\{1-\left[\frac{\sin(\delta-\theta_{xz})}{\cos\theta_{xz}\sin\delta}\right]\right\}^2}}{2\left\{\frac{\sin(\delta-\theta_{xz})}{\sin 2\theta_{xz}}\frac{\sin[180°-(\delta+\theta_{xz})]}{\sin\delta}\right\}}\right]$$

where $\theta_{xz} < \delta < 90°$, and also where, as previously explained, $\theta_{xz}$ equals the cone half angle in the vertical plane X–Z. $\theta_{xy}$ equals the cone half angle in the horizontal plane X–Y where $\theta_{xy}$ is $> \theta_{xz}$, and $\delta$ equals the cone rake angle in the vertical plane. The table of FIG. 5 is included herein to exemplify the flexible shape of the subject forebody. It is seen, for example, that with a rake angle $\delta$ of 30 degrees, and a cone half angle $\theta_{xz}$ of 20 degrees that the cone half angle $\theta_{xy}$ will, in accordance with the above formula, be 43.16 degrees, all while maintaining the circular interface of the cone. It may be further seen that if the rake angle $\delta$ is increased to 40 degrees while keeping the same cone half angle $\theta_{xz}$ (20 degrees), that $\theta_{xy}$ will be 32.15 degrees. Since the rake angle is subject to specified limits for a given velocity and corridor, it may be recognized therefore that $\theta_{xy}$ is likewise flexible within calculable limits, thereby enabling optimization of the latter with regard to other characteristics such as the vehicle's stability. Still further it is seen that should a given reentry velocity dictate a corridor that requires a lift to drag ratio corresponding to the rake angle $\delta$ of 60 degrees, and a cone half angle $\theta_{xz}$ equal to 30 degrees, that the cone half angle $\theta_{xy}$ will be 35.26 degrees while maintaining the circular interface. Thus the angles $\theta_{xy}$ and $\theta_{xz}$ may be varied within limits defined for the rake angles $\delta$ in accordance with the formula so as to thereby optimize the vehicle's characteristics (heating) in accordance with their relative importance for any given mission.

As the various cone angles and rake angle of the elliptical cone configuration are changed to suit a specific mission the locus of centers of gravity to produce trim at zero angle of attack also is changed. Movement of the center of gravity will be acceptable within certain limits defined by longitudinal and directional stability characteristics. It has been found that in addition to the many advantages noted thus far, the elliptical cone forebody possesses improved latitude within the above limits in placing the center of gravity of the vehicle, irrespective of the particular cone angles involved. This is advantageous because the interior design and structure of the vehicle is thus accomplished with greater respect to efficiency, comfort, and packaging therein. This improvement is noteworthy primarily because prior art approaches to hypersonic vehicle design have had acceptable characteristics in many respects except their stability, particularly their directional stability, as noted above. The subject design, however, is found to so significantly improve prior deficiencies in directional stability characteristics that design limitations are now dictated by the longitudinal direction characteristic. An example of the latitude in placing the center of gravity for the elliptical cone forebody is shown in FIG. 6 wherein the dotted line 15 indicates the locus of center of gravity placement for each of three exemplary forebody cones having respective half cone angles $\theta_{xz}$ of 40 degrees, 30 degrees, and 20 degrees. In all three cones the rake angle $\delta$ is maintained at a constant 50 degrees since this factor is found to have little effect on stability characteristics. The stability limits are noted by the symbol  for longitudinal stability, and  for directional stability. It is additionally noted that each of the three exemplary forebodies are made to trim at zero angle of attack for the reason that it is known that a cone trimming at this angle produces the optimum combined radiative and convective heating characteristics, and also because the vehicle is readily amenable to flow field analysis. Thus a cone having a half angle $\theta_{xz}$ of 40 degrees and a rake angle of 50 degrees, will provide a lift to drag ratio of .79. With this cone it is noted that the center of gravity of the vehicle may be placed anywhere between the longitudinal stability limit 21 and the bottom surface of the vehicle indicated at 13. Likewise, it is seen that the vehicle having a cone half angle of 30 degrees may have its center of gravity disposed within the limits defined by the longitudinal stability limit 19 and the bottom of the vehicle 13. Still further, it is seen that with a cone half angle $\theta_{xz}$ of 20 degrees, the center of gravity of the vehicle may be disposed within the limits defined by the longitudinal stability marker 9 and the bottom of the vehcile 13. It is noted in all the above three examples that the longitudinal stability limit becomes the limiting factor in center of gravity placement, thereby clearly indicating the improved directional stability limits 23, 17, and 11, respectively, brought about by the forebody shape of the invention. It is also noted that in each of the three forebodies the lift to drag ratio decreases from .79 to .76 to .74, respectively. It becomes apparent that the latitude within which the center of gravity must be placed is greater as the cone half angle increases, and also, as previously explained, the latitude within which it may be placed, without disturbing the stability of the vehicle, is significantly greater than those designs proposed heretofore.

In summary, it has been shown that a hypersonic reentry vehicle having a forebody or heat shield portion which is raked off to produce a necessary lift to drag ratio has acceptable stability characteristics in both the longitudinal and directional planes. This is found to be a result of the larger aerodynamic surfaces of the shape in the plane of aerodynamic incidence, thereby causing improved performance over wide hypersonic ranges. Additionally, since the cone half angle ($\theta_{xz}$) is found to be independent to a large degree of the lift to drag ratio, the former may be optimized to fall within heating and center of gravity location constraints.

It is to be recognized that the diagrams herein are illustrative of a multitude of angular combinations which may be used within the scope of the invention, and that the determination of the center of gravity locations therein may be accomplished by well known procedures that may be applied to cones having angular combinations other than those shown. Therefore, the invention should not be interpreted as the specific examples set forth, but should be understood to exist within the light of the teachings herein and within the scope of the appended claims. Therefore what is claimed and desired to be secured by Letters Patent is:

1. A heat shield for use on an earth reentry vehicle, said heat shield having an external surface in the shape of an elliptical cone which is raked across the axis thereof to form a circular base, the major arcs of said elliptical cone defining the upper and lower surfaces of the heat shield when the vehicle is in its normal reentry attitude.

2. A heat shield for use on an interplanetary space vehicle which trims at zero angle of attack while entering the earth's atmosphere;
    said heat shield having an external surface in the shape of a cone which is elliptical in cross section and which is raked across the axis thereof to form a circular base;
    the major arcs of said elliptical cone defining the upper and lower surfaces, respectively, of said heat shield when the vehicle is trimming at zero angle of attack during reentry.

3. A space vehicle for traversing the atmosphere at velocities in the hypersonic range, said vehicle comprising:
    an afterbody portion and a forebody portion intimately meeting each other at a common interface plane, said forebody portion defining the shape of an elliptical cone which is raked across the axis thereof to form a circular base which constitutes said common interface plane.

4. A space vehicle for traversing the earth's atmosphere at velocities in the hypersonic range while trimming at zero angle of attack comprising:
    an afterbody portion and a heat shield portion, said heat shield portion defining the shape of a cone which is elliptical in planes perpendicular to the axis thereof and which is raked across said axis to form a circular base, the major arcs of elliptical cross sections of said cone defining the upper and lower surfaces of said heat shield when said vehicle is trimming at zero angle of attack during reentry.

5. A space vehicle for traversing the earth's atmosphere at velocities in the hypersonic range, said vehicle comprising:
    an afterbody portion and a forebody portion, each of which has a circular base; the bases of each said portion intimately meeting along a common interface plane; said forebody portion constituting a heat shield for said vehicle and defining the shape of a raked cone which is elliptical in planes perpendicular to the axis thereof.

6. A space vehicle for traversing the earth's atmosphere at velocities in the hypersonic range, said vehicle comprising:
    an afterbody portion and a forebody portion intimately connected thereto along a common interface, said common interface being of circular shape; and
    said forebody portion constituting a vehicle heat shield which defines the shape of a raked cone that is elliptical in a sectional plane perpendicular to the axis thereof.

7. An interplanetary space vehicle for traversing an entry corridor to the earth at velocities in the hypersonic range, said vehicle comprising:
    first and second body portions intimately meeting in a common plane which is circular in form, said second body portion defining the shape of a raked cone the cross section of which is elliptical in a plane perpendicular to the axis thereof.

8. An interplanetary space vehicle for traversing an entry corridor to the earth at velocities in the hypersonic range, said vehicle comprising:
    first and second body portions intimately meeting in a common plane which is circular in form, said second body portion defining the shape of a raked cone the cross section of which is elliptical in a plane perpendicular to the axis thereof; and the center of gravity of said first and second body portions disposed to trim said vehicle at zero angle of attack during the entry period.

9. A space vehicle for traversing the atmosphere of the earth at velocities in the hypersonic range, said vehicle comprising:
    a body portion and a heat shield portion intimately meeting each other at a common interface, said heat shield portion being in the shape of a cone which is elliptical in cross sectional planes perpendicular to the axis thereof and which is raked across said axis so as to form a circular base which constitutes said common interface; the major arcs of the elliptical cross sections of said cone defining the upper and lower surface of said heat shield when said vehicle is in its normal entry attitude; and the center of gravity of said vehicle disposed to cause it to trim at zero angle of attack in the normal reentry attitude.

References Cited by the Examiner

UNITED STATES PATENTS 3,188,961 6/1965 Scruggs et al. _____ 102—92.5
3,204,892 9/1965 Powell _____ 244—1

FERGUS S. MIDDLETON, *Primary Examiner.*